US009978223B2

(12) United States Patent
Min

(10) Patent No.: US 9,978,223 B2
(45) Date of Patent: May 22, 2018

(54) FINANCIAL DEVICE AND METHOD OF CONTROLLING FINANCIAL DEVICE

(71) Applicant: LG CNS CO., LTD., Seoul (KR)

(72) Inventor: Jae Seul Min, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days. days.

(21) Appl. No.: 15/453,307

(22) Filed: Mar. 8, 2017

(65) Prior Publication Data

US 2017/0263083 A1 Sep. 14, 2017

(30) Foreign Application Priority Data

Mar. 8, 2016 (KR) ........................ 10-2016-0027492

(51) Int. Cl.
*G06K 7/00* (2006.01)
*G07F 19/00* (2006.01)

(52) U.S. Cl.
CPC ................................ *G07F 19/2055* (2013.01)

(58) Field of Classification Search
USPC .................. 235/375, 379, 380; 705/5, 35–45
See application file for complete search history.

(56) References Cited

U.S. PATENT DOCUMENTS 8,055,184 B1 11/2011 DiMartino et al.
2011/0006112 A1 1/2011 Mueller
2011/0135092 A1 6/2011 Lehner
2013/0062410 A1* 3/2013 Mitchell ............ G06K 13/0868 235/449
2014/0151449 A1 6/2014 Jenkins et al.
2014/0158768 A1 6/2014 Ray et al.
2014/0332591 A1 11/2014 Ishikawa et al.

FOREIGN PATENT DOCUMENTS

DE 102005043317 B3 4/2007
DE 102010000102 A1 7/2011
DE 202014105609 U1 12/2014
EP 2 367 158 A1 9/2011
EP 2 657 888 A1 10/2013

(Continued)

*Primary Examiner* — Matthew Mikels

(74) *Attorney, Agent, or Firm* — Dentons US LLP

(57) ABSTRACT

A financial device includes: an insertion part to which a medium is inserted; a random number generation unit configured to generate an signal including information on a copying prevention number for preventing copying of a medium according to an on signal; a detection unit installed near the insertion part and configured to generate a detection signal by detecting the existence of the medium; a determination unit configured to determine whether the medium is completely inserted or is being removed based on the detection signal; a controller configured to generate the on signal to make the random number generation unit operate, wherein the controller generates an off signal to make the random number generation unit not operate when it is determined that the medium is completely inserted and generates the on signal to make the random number generation unit operate again when it is determined that the medium is being removed; and a card reader unit installed at one position of a movement path of the inserted medium and configured to recognize information included in the medium.

10 Claims, 14 Drawing Sheets

(56) References Cited

FOREIGN PATENT DOCUMENTS

| | | | |
|---|---|---|---|
| EP | 2 916 323 | A1 | 9/2015 |
| JP | 2005-266999 | A | 9/2005 |
| JP | 2015-45934 | A | 3/2015 |
| JP | 2015-060610 | A | 3/2015 |
| JP | 2015-215714 | A | 12/2015 |
| KR | 96-001449 | B1 | 1/1996 |
| KR | 10-2004-0070379 | A | 8/2004 |
| KR | 10-2009-0062592 | A | 6/2009 |
| KR | 10-2011-0098402 | A | 9/2011 |

* cited by examiner

FINANCIAL DEVICE AND METHOD OF CONTROLLING FINANCIAL DEVICE

CROSS REFERENCE TO RELATED APPLICATION

This application claims priority from Korean Patent Application No. 10-2016-0027492, filed on Mar. 8, 2016, which is hereby incorporated by reference for all purposes as if fully set forth herein.

BACKGROUND OF THE DISCLOSURE

1. Technical Field

The present embodiment relates to a financial device capable of preventing copying of a medium including a card, and a method of controlling the same.

2. Description of the Prior Art

In general, when a customer desires to deposit/withdraw cash or a check, or perform banking through a bankbook, the user uses an Automatic Teller's Machine (ATM) by using a medium including a card. In general, the card records user information and a code together in a magnetic stripe and identifies card information and the code through an identification device installed within a reader itself or connected online, so as to identify a user identity when used.

However, the method using the magnetic stripe has a problem in that information recorded in the magnetic stripe may be copied and stolen if a password (code) is hacked online.

More specifically, a skimming device such as an illegal medium recognition device or a skimmer which can capture the information recorded in the magnetic stripe may be additionally installed at a card insertion part of the ATM. In such a situation, when the customer inserts the card into the insertion part, the card may be copied.

In order to solve the problem, the prior arts include a method of limiting card insertion by detecting a skimming device and a method of physically removing the skimming device or preventing installation of the skimming device.

However, the prior art have a limitation in that the skimming device has been continuously developed and thus overcomes conditions by which the skimming device is detected and physical conditions that interrupt removal and installation.

Further, the prior art including the method of limiting the card insertion has a problem of hindering usability of the ATM.

In addition, the prior art have a limitation in that it cannot assist in apprehending a criminal who installs the skimming device to copy the card and abuses the copied card.

SUMMARY OF THE INVENTION

Under such a background, according to an aspect of the present embodiment, the present embodiment has been made to solve the problems and provides a financial device and a financial device control method capable of preventing copying even though a skimming device is installed at a medium insertion part.

In accordance with an aspect of the present embodiment, a financial device is provided. The financial device includes: an insertion part to which a medium is inserted; a random number generation unit configured to generate a signal including random number information for preventing skimming of the medium; a detection unit installed near the insertion part and configured to generate a detection signal by detecting the existence of the medium; and a controller configured to control the generation of the copying prevention number by identifying a state of the medium according to the detection signal.

In accordance with another aspect of the present embodiment, a method of controlling a financial device is provided. The method includes: a determination step of determining whether a medium is completely inserted or is being removed based on a detection signal generated by a detection of the existence of the medium; signal generation step of generating a signal including information on a random number for preventing skimming of a medium by a random number generation unit; signal generation stopping step of stopping the generation of the signal by the random number generation unit when it is determined that the medium is completely inserted; an signal re-generation step of generating the signal again by the random number generation unit when it is determined that the medium is being removed; and a recognition step of recognizing information included in the medium by a recognition device installed at one position on a movement path of the inserted medium.

According to the present embodiment as described above, even though a skimming device installed at the insertion part into which the medium is inserted, a financial device and a financial device control method capable of preventing the medium from being copied can be provided.

BRIEF DESCRIPTION OF THE DRAWINGS

The above and other objects, features and advantages of the present embodiment will be more apparent from the following detailed description taken in conjunction with the accompanying drawings, in which.

DETAILED DESCRIPTION OF THE EXEMPLARY EMBODIMENTS

Figure 1:
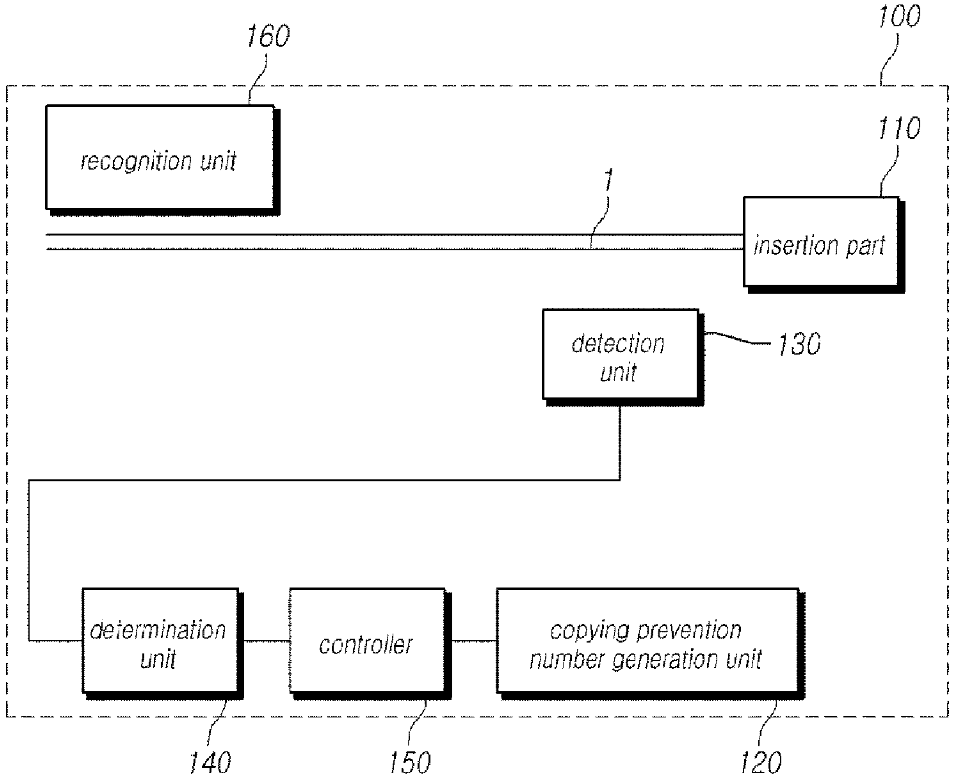
FIG. 1 is a view illustrates a first embodiment of a financial device.

Hereinafter, the embodiments of the present disclosure will be described in detail with reference to the accompanying illustrative drawings. In designating elements of the drawings by reference numerals, the same elements will be designated by the same reference numerals although they are shown in different drawings. Further, in the following description of the present embodiment, a detailed description of known functions and configurations incorporated herein will be omitted when it may make the subject matter of the present embodiment rather unclear.

In addition, terms, such as first, second, A, B, (a), (b) or the like may be used herein when describing components of the present embodiment. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

Hereinafter, assuming that the financial device is the ATM, an embodiment will be described. However, this assumption is merely for convenience of description, and technical idea of the present embodiment is not limited to the ATM.

FIG. 1 illustrates a first embodiment of a financial device. Referring to FIG. 1, a financial device 100 according to an embodiment may include an insertion part 110 into which a medium is inserted; a random number generation unit 120 for generating the signal including information on a copying prevention number or random number to prevent skimming of a medium according to an on signal; a detection unit 130 for generating a detection signal by detecting the existence of the medium, the detection unit being installed near the insertion part 110; a determination unit 140 for determining whether the medium is completely inserted or is being removed based on the detection signal; a controller 150 for generating the on signal to make the random number generation unit 120 operate, wherein the controller 150 generates an off signal to make the random number generation unit 120 not operate when it is determined that the medium is completely inserted, and make the random number generation unit 120 operate again when it is determined that the medium is being removed; and a card reader unit card reader unit 160 for recognizing information included in the medium, the recognition medium being installed at one position on a movement path of the inserted medium.

In the present disclosure, the term of the random number and the term of copying prevention number may be used interchangeably with each other.

The insertion part 110 of the financial device 100 according to an embodiment is an entrance into which the medium can be inserted, and the medium may be inserted inside the financial device therethrough. Further, the insertion part 110 may further include a device for recognizing the medium and allow only the medium to be inserted. The medium may have a unique medium number and may include a card by which financial transactions can be performed through the financial device.

For example, the random number generation unit 120 of the financial device 100 according to an embodiment embodiment may generate the signal including information on a random number or a copying prevention number for preventing copying of a medium according to an on signal toward an external area of the insertion part 110.

The signal may be an electrical signal, and the signal may include one or more signals.

The copying prevention number is a number relevant to the medium number and may be a first copying prevention number received from an external server, which is a server of a company related to the medium or a server of a bank, or a second copying prevention number generated by itself.

For example, the random number generation unit 120 may apply Magnetic Secure Transmission (MST) for wireless transmission of the signal. The MST refers to a type in which when the user touches a smart phone including credit card information to a credit card payment terminal, the payment terminal reads the credit card information and performs the payment. That is, the MST is a method of performing the payment by wirelessly transmitting information on a magnetic credit card and may be different from Near Field Communication (NFC).

The signal output from the random number generation unit 120 may jam information acquired by an illegal medium recognition device, which can be illegally installed in an external area of the insertion part 110, and prevent the card from being recognized.

Further, the signal output from the random number generation unit 120 may have a copying prevention number and may make the illegal medium recognition device exposed to the signal recognize the copying prevention number instead of the medium number by jamming the information that the illegal medium recognition device recognizes.

At this time, the copying prevention number may be a first copying prevention number received from an external server connected to the network or a second copying prevention number which is a random number randomly generated by the copying prevention number generator.

The illegal medium recognition device, which can be illegally installed, may include a swipe type or an insertion type Magnetic Script Reader/Writer (MSRW).

For example, the random number generation unit 120 may be implemented as a loop-pay module.

The detection unit 130 of the financial device 100 according to an embodiment may be installed near the insertion part 110 and may detect the existence of the medium and generate a detection signal.

For example, the detection unit 130 is a sensor that may detect a change such as reflection or blocking according to the existence of the medium and may include an optical sensor.

The determination unit 140 of the financial device 100 according to an embodiment may determine whether the medium is completely inserted or is being removed based on the detection signal of the detection unit 130.

For example, when the detection signal is generated by the detection unit 130 and the generation is stopped, the determination unit 140 may determine that the medium inserted into the insertion part 110 is completely inserted.

Further, when the detection signal is generated by the detection unit 130 again after it is determined that the medium is completely inserted, the determination unit 140 may determine that the medium is being removed from the insertion part 110.

The controller 150 of the financial device 100 according to an embodiment may generate an on signal to allow the random number generation unit 120 to operate. When it is determined that the medium is completely inserted into the insertion part 110, the controller 150 generate an off signal to allow the random number generation unit 120 to not operate. When it is determined that the medium is being removed from the insertion part 110, the controller may generate the on signal to allow the random number generation unit 120 to operate again.

Alternatively, when the detection signal is generated by the detection unit 130, the controller 150 may generate the on signal to allow the random number generation unit 120 to operate.

The signal or the signal generated from the random number generation unit 120 may prevent the illegal medium recognition device from recognizing the medium including the card by jamming the medium recognition device which may be illegally installed outside the insertion part 110.

Accordingly, after the medium is completely inserted, the controller 150 may generate an off signal and make the random number generation unit 120 not operate to allow the card reader unit 160 to normally recognition information included in the medium.

The card reader unit 160 of the financial device 100 according to an embodiment may recognize the information included in the medium and may be the same as a medium recognition device which may be illegally installed.

For example, the card reader unit 160 may be installed at one position after a position of the detection unit 130 on a movement path 1 of the inserted medium.

As described above, according to an embodiment, in order to nullify the illegal medium recognition device attached to a financial device or the skimmer corresponding to an illegal user using the illegal medium recognition device, a copying prevention signal is generated and transmitted during a process of inserting a medium (card) into the financial device or withdrawing the medium (card) from the financial device, so that a skimming device recognizes the copying prevention signal instead of medium information.

At this time, the copying prevention number generator 120, which can be implemented as the loop-pay module, is a module, which allows the medium recognition device to recognize the medium information through an electromagnetic wave signal without an actual magnetic card.

In a process before and after the copying prevention number generator 120 operates after the medium is normally inserted into the financial device, the copying prevention number generator 120 may continuously transmit copying prevention information, which is generated from the outside or by itself, to the outside instead of the medium information such as a card number.

At this time, since the copying prevention information transmitted from the copying prevention number generator in a Magnetic Secure Transmission (MST) scheme can be recognized by the card reader unit 160 of the financial device, the controller 150 may perform a function of filtering the copying prevention information by determining whether the recognized information is legal medium information or copying prevention information.

That is, the controller 150 may identify whether the recognized information is the legal medium information since the controller 150 already knows the first copying prevention number received from the external server and the second copying prevention number generated by itself.

Further, after the skimming device attached to the financial device misrecognizes the copying prevention number as the medium information according to the present embodiment, an illegal payment or financial transactions may be performed through the copying prevention number.

In the present disclosure, the term of the illegal medium recognition device may be used interchangeably with the term of the skimming device.

Accordingly, when the copying prevention number is recognized from the medium via the illegal medium recognition device, the financial device according to the present embodiment may further include a transmitter 170*b* (see FIG. 5) for generating illegal medium recognition device operation information indicating that the illegal medium recognition device is operating and then transmitting the illegal medium recognition device operation information to a terminal of a security manager.

Through the use of the transmitter 170*b*, the installation of the illegal medium recognition device and the illegal operation thereof may be notified to the security manager in real time, and thus it is possible to remove the illegal recognition device and prosecute the criminal who is a user of the illegal medium recognition device.

The operation of the financial device according to the embodiment described above will be described in more detail through FIG. 2 below.

Figure 2:
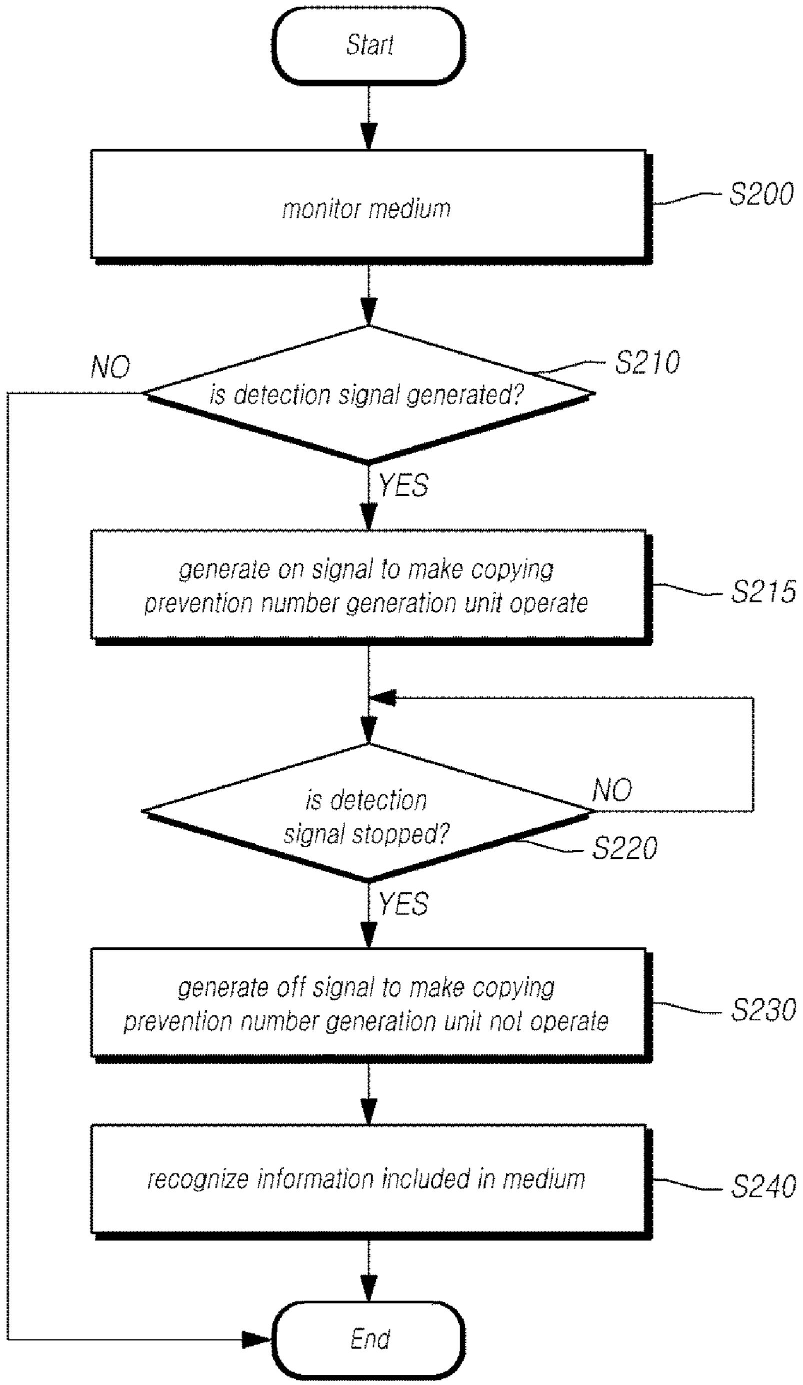
FIG. 2 is a view illustrates an example for describing an operation of the financial device according to an embodiment of the present invention.

FIG. 2 illustrates an example for describing the operation of the financial device according to an embodiment.

Referring further to FIG. 2, in the financial device 100 according to an embodiment, the detection unit 130 may be installed near the insertion part into which the medium is inserted and monitor the medium in S200.

For example, the detection unit 130 is a sensor that may detect a change including reflection or blocking according to the existence of the medium and may include an optical sensor.

After step S200 is performed, the determination unit 140 may determine whether a detection signal of the detection unit 130 is generated in S210. When it is determined that the detection signal of the detection unit 130 is generated (YES) in S210, the controller 150 may generate an on signal to make the random number generation unit 120 operation in S215.

Although it is possible to make the random number generation unit 120 operate at a time point when the medium is inserted through step S215, it is only an example and the present embodiment is not limited thereto. That is, the controller 150 may generate the on signal to make the random number generation unit operate before step S210 regardless of the time point when the medium is inserted.

After step S215 is performed, the determination unit 140 may determine whether the detection signal of the detection unit 130 is stopped in S220. When it is determined that the detection signal of the detection unit 130 is stopped (YES) in step S220, the determination unit 140 may determine that the medium is completely inserted into the insertion part 110.

Unlike this, when it is determined that the detection signal of the detection unit 130 is not generated (NO) in step S210, a medium processor performed by the financial device may end. When it is determined that the detection signal of the detection unit 130 is not stopped (NO) in step S220, the determination unit 140 may perform step S220 again. At this time, the determination unit 140 may wait for the stopping of the detection signal.

When results of step S210 and step S220 correspond to YES, the controller 150 may generate an off signal to make the random number generation unit 120 not operate in S230.

After step S230 is performed, the card reader unit 160 may recognize information included in the medium in S240. Through the performance of step S240, the user of the medium may normally perform financial transactions with the financial device.

Figure 3:
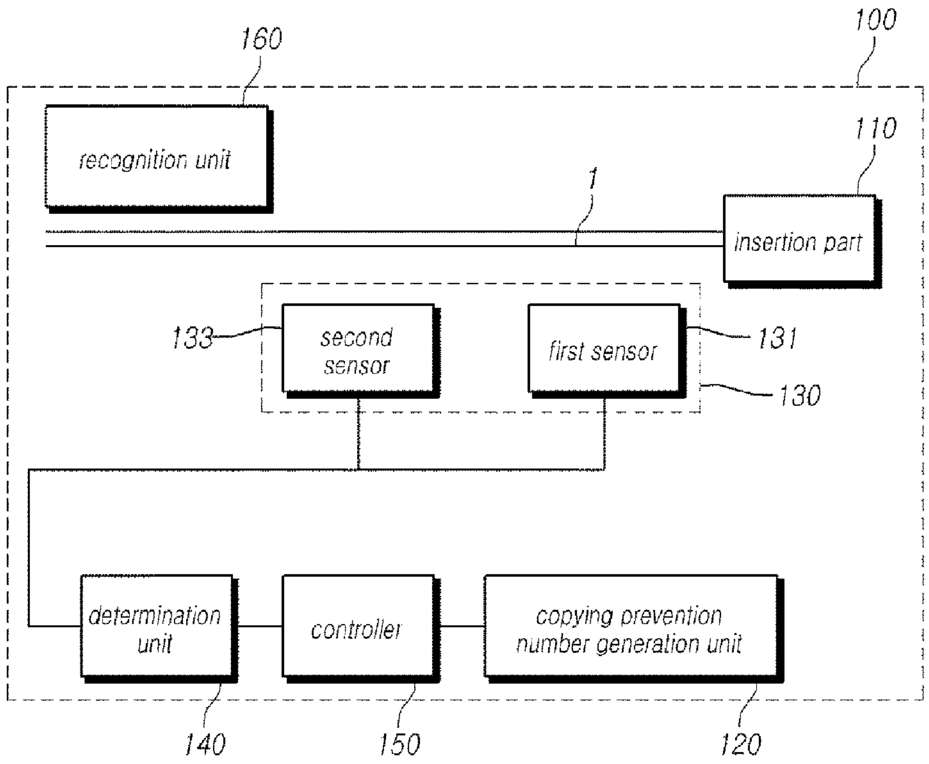
FIG. 3 is a view illustrates a financial device according to the second embodiment.

FIG. 3 illustrates a second example of the financial device according to the present embodiment.

Referring to FIG. 3, the detection unit 130 of the financial device 100 according to the present embodiment may include a first sensor 131 installed in a first positions near the insertion part 110 on a movement path of the inserted medium to detect the existence of the medium and a second sensor installed in a second position spaced apart from the first position by a predetermined distance to detect the existence of the medium.

The first sensor 131 may be disposed at the position of the insertion part 110.

Accordingly, when a detection signal of the second sensor 133 is generated after a detection signal of the first sensor 131 is generated, the determination unit 140 may determine that the medium is completely inserted into insertion part (110).

Further, when the detection signal of the first signal 131 is generated after the detection signal of the second sensor 133 is generated, the determination unit 140 may determine that the medium is being removed from the card reader unit (160).

Further, when the detection signal of the first sensor 131 is stopped after it is determined that the medium is completely inserted, the card reader unit 160 may recognize information included in the medium.

An operation of the financial device 100 according to the present embodiment of FIG. 3 will be described in more detail through FIGS. 4A, 4B, and 4C below.

Figure 4A:
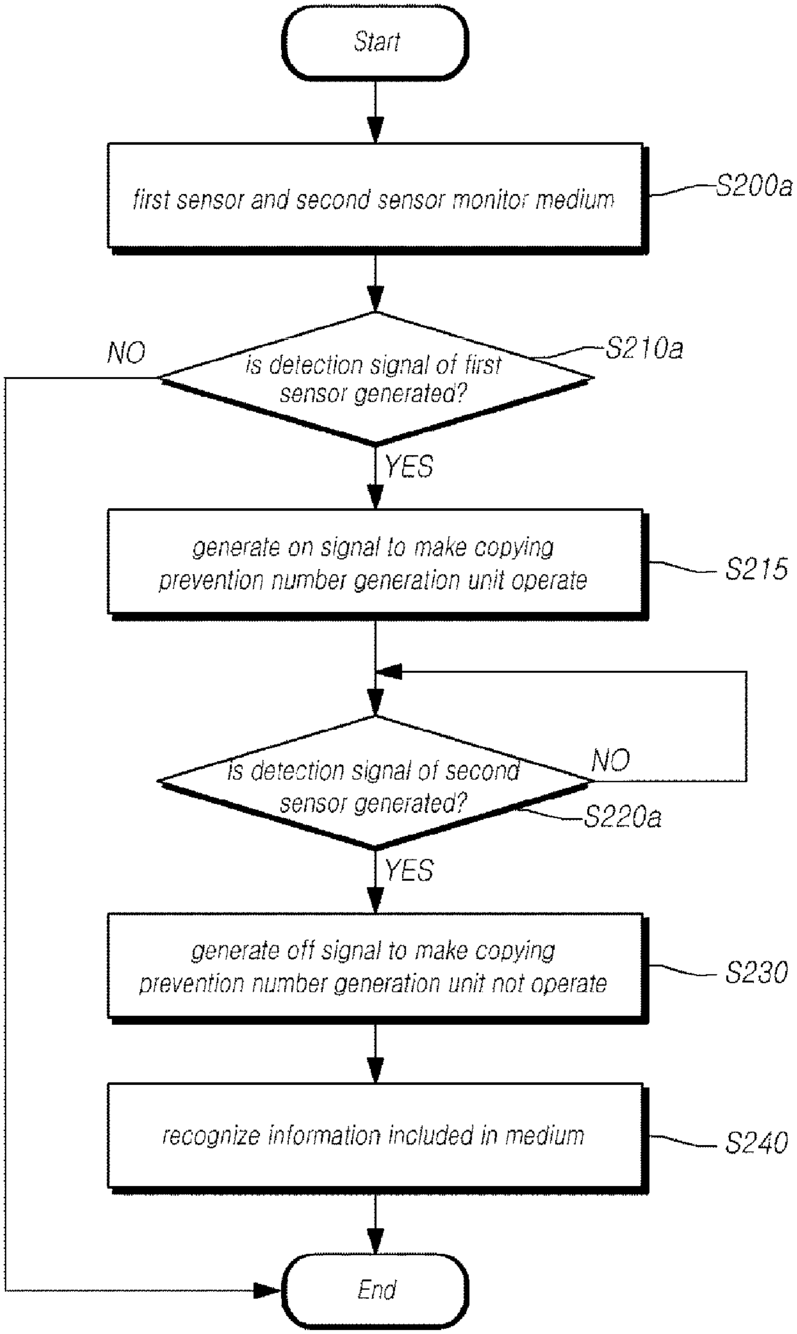
FIG. 4A is a view illustrates an example of the operation of the financial device.
Figure 4B:
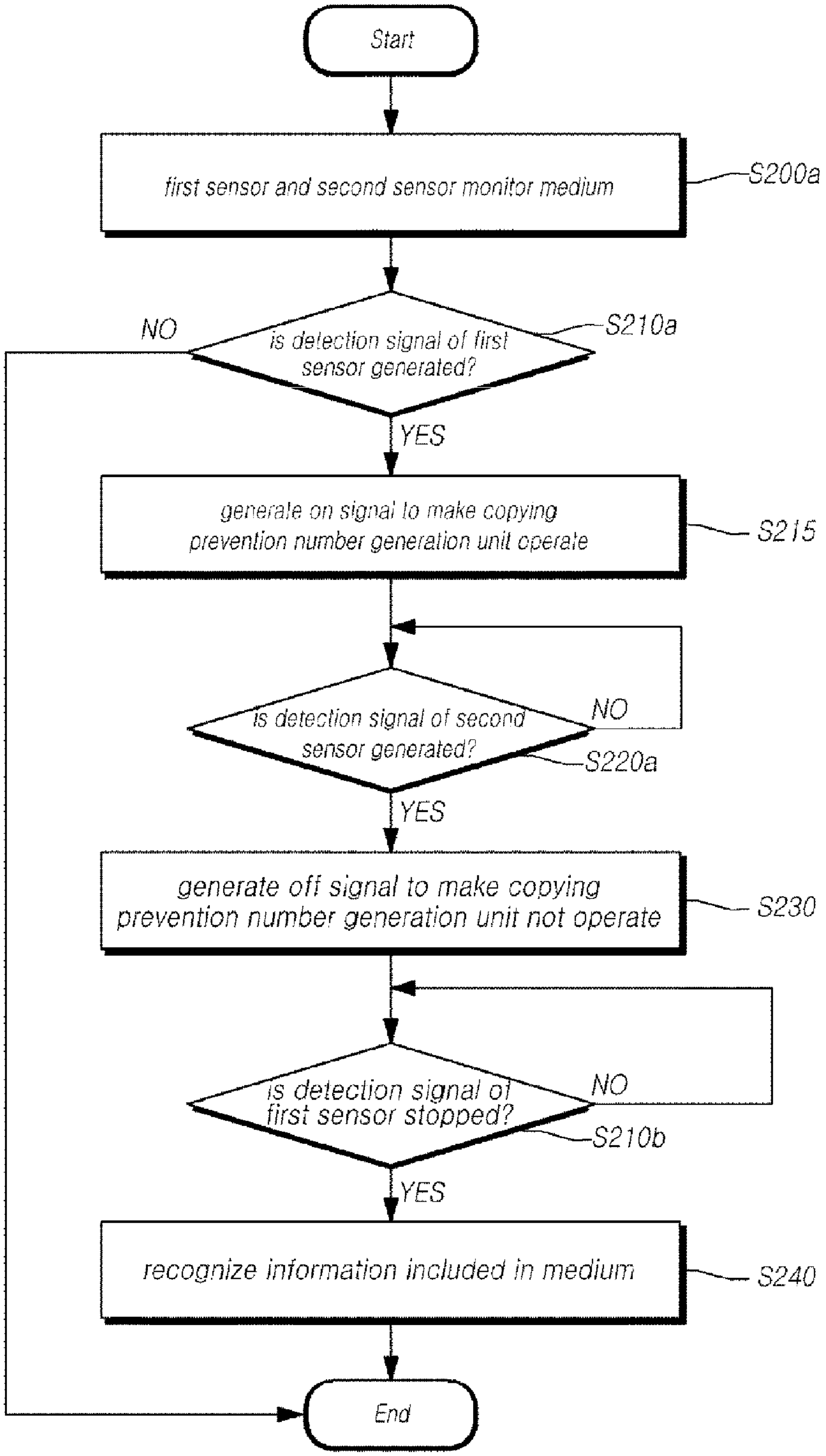
FIG. 4B is a view illustrates another example for describing the operation of the financial device.
Figure 4C:
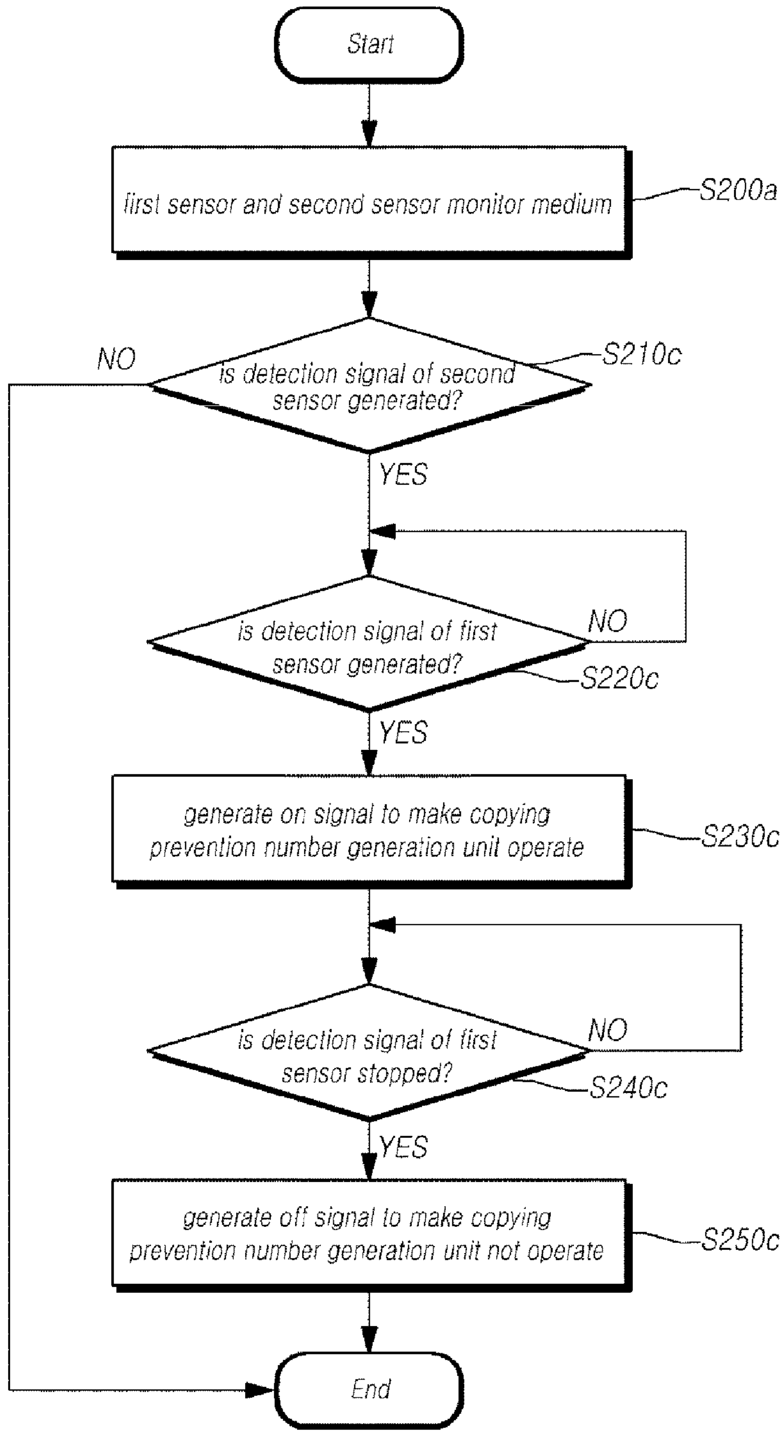
FIG. 4C is a view illustrates another example for describing the operation of the financial device.

FIGS. 4A, 4B, and 4C illustrate an example, another example, and still another example for describing the operation of the banking device according to the present embodiment, respectively.

Referring further to FIG. 4A, in the financial device 100 according to the present embodiment, the first sensor 131 and the second sensor 133 of the detection unit 130 installed at the first position and the second position on a movement path 1 of the medium inserted into the insertion part 110 may monitor the medium in S200*a*.

For example, the first sensor 131 and the second sensor 133 are sensors that may detect a change including reflection or blocking according to the existence of the medium and may include an optical sensor.

After step S200*a* is performed, the determination unit 140 may determine whether the detection signal of the first sensor 131 is generated in S210*a*. When it is determined that the detection signal of the first sensor 131 is generated (YES) in step S210*a*, the controller 150 may generate an on signal to make the random number generation unit operate in S215.

After step S215 is performed, the determination unit 140 may further determine whether the detection signal of the second sensor 133 is generated in S220*a*. When it is determined that the detection signal of the second sensor 133 is generated (YES) in step S220*a*, the determination unit 140 may determine that the medium is completely inserted into the insertion part 110.

Unlike this, when it is determined that the detection signal of the first sensor 131 is not generated (NO) in step S210*a*, a medium processor performed by the financial device may end. When it is determined that the detection signal of the second sensor 133 is not generated (NO) in step S220*a*, the determination unit 140 may perform step S220*a* again. At this time, the determination unit 140 may wait for the generation of the detection signal of the second sensor 133.

When a result of step S220*a* corresponds to YES, the controller 150 may generate the off signal to make the random number generation unit 120 not operate in S230.

After step S230 is performed, the card reader unit 160 may recognize information included in the medium in S240. Through the performance of step S240, the user of the medium may normally perform financial transactions with the financial device.

Referring further to FIG. 4B, in the financial device 100 according to the present embodiment, the detection unit 130 may monitor the medium through the first sensor 131 and the second sensor 133 installed at the first position and the second position on the movement path 1 of the medium inserted into the insertion part 110 in S200*a*, and the determination unit 140 may determine whether the detection signal of the first sensor 131 is generated in S210*a*. When it is determined that the detection signal is generated (YES) in step S210*a*, the controller 150 may generate the on signal to make the random number generation unit 120 operate in S215. Thereafter, the determination unit 140 may further determine whether the detection signal of the second sensor 133 is generated in S220*a*. When it is determined that the detection signal of the second sensor 133 is generated (YES) in step S220*a*, the determination unit 140 may determine that the medium is completely inserted.

When a result of step S220*a* corresponds to YES, the controller 150 may generate the off signal to make the random number generation unit 120 not operate in S230.

After step S230 is performed, the determination unit 140 may determine whether the detection signal of the first sensor 131 is stopped in S210*b*. When it is determined that the detection signal of the first sensor 131 is stopped (YES) in step S210*b*, the card reader unit 160 may read information included in the medium in S240. Through the performance of step S240, the user of the medium may normally perform financial transactions with the financial device.

Unlike this, when it is determined that the detection signal of the first sensor 131 is not stopped (NO) in step S210*b*, the card reader unit 160 may perform step S210*b* again. At this time, the card reader unit 160 may wait for the stopping of the detection signal of the first sensor 131.

Referring further to FIG. 4C, in the financial device 100 according to the present embodiment, the detection unit 130 may detect the medium through the first sensor 131 and the second sensor 133 installed in the first position and the second position on the movement path 1 of the medium inserted into the insertion part 110 in S200*a*, and the determination unit 140 may determine whether the detection signal of the second sensor 133 is generated in S210*c* and, when it is determined that the detection signal is generated (YES) in step S210*c*, further determine whether the detection signal of the first sensor 131 is generated in S220*c*. When it is determined that the detection signal of the first sensor 133 is generated (YES) in step S220*c*, the determination unit 140 may determine that the medium is being removed.

Unlike this, when it is determined that the detection signal of the second sensor 133 is not generated (NO) in step S210*c*, a medium processor performed by the financial device may end. When it is determined that the detection signal of the first sensor 133 is not generated after the detection signal of the second sensor 133 is generated (NO) in step S220*c*, the determination unit 140 may perform step S220*c* again. At this time, the determination unit 140 may wait for the generation of the detection signal of the first sensor 133.

When results of step S210*c* and step S220*c* correspond to YES, the controller 150 may generate the on signal to make the random number generation unit 120 operate in S230*c*. The performance of step S230*c* may prevent an illegal medium recognition device, which may be illegally installed outside the insertion part 110, from recognizing the information included in the removed medium.

After step S230*c* is performed, the determination unit 140 may further determine whether the detection signal of the first sensor 131 is stopped in S240*c*.

Accordingly, when it is determined that the detection signal of the first sensor 131 is stopped (YES) in step S240*c*, the controller 150 may generate the off signal to make the random number generation unit 120 not operate again. The determination of YES in step S240*c* may mean that the medium has been completely removed.

The financial device 100 according to the present embodiment described using FIGS. 1 to 4C has an effect to prevent the illegal medium recognition device, which may be illegally installed outside the insertion part 110 by a criminal who uses the skimming device, from recognizing the information included in the medium.

Further, the financial device 100 according to the present embodiment may make the illegal medium recognition device, which may be illegally installed outside the insertion part 110, recognize a first copying prevention number for apprehending the skimmer rather than the information included in the medium. Accordingly, the financial device 100 according to the present embodiment may arrest the criminal who attempts financial transactions through a copied medium including the first copying prevention number. To this end, the card reader unit 160 may additionally recognize the information included in the medium by comparing it with information on the first copying prevention number.

Figure 5:
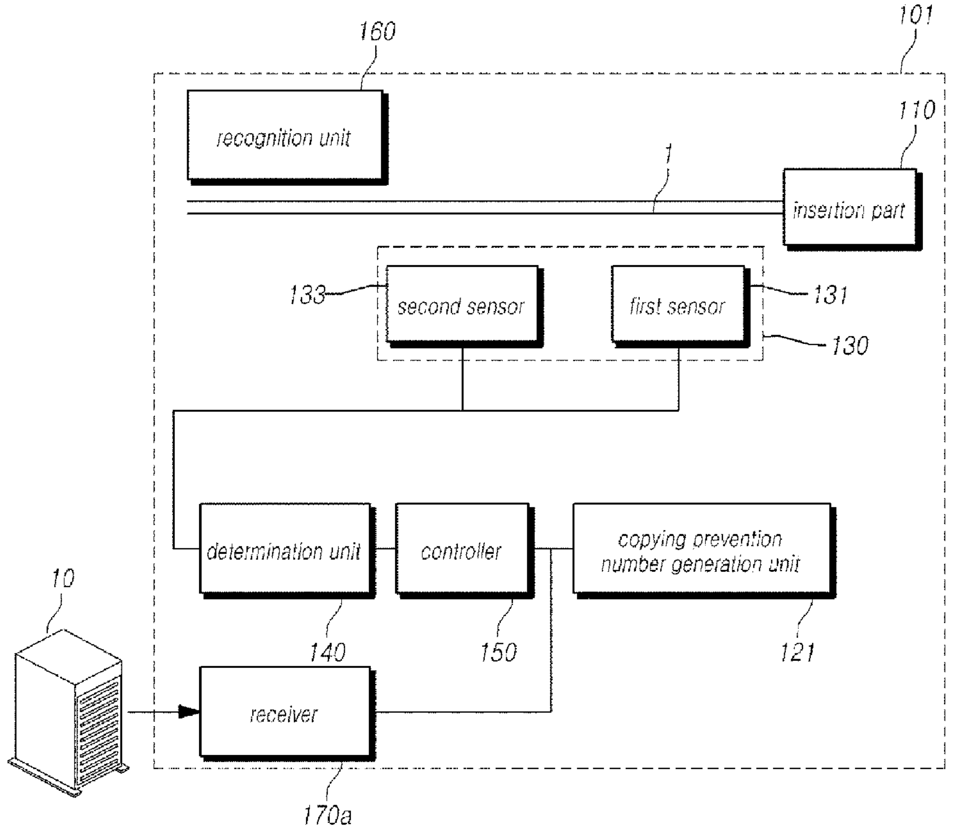
FIG. 5 is a view illustrates a third embodiment of the financial device.

FIG. 5 illustrates a third example of the financial device according to the present embodiment.

Referring to FIG. 5, a financial device 101 according to the present embodiment may further include a receiver 170*a* connected to an external server 10, which is a server of a company related to the medium or a server of a bank, through a network to receive the information on the first copying prevention number for apprehending the illegal skimmer compared to the financial device 100 according to the present embodiment described through FIGS. 1 to 4C.

Accordingly, a random number generation unit 121 included in the financial device 101 may generate a first signal including the received information on the first copying prevention number toward an external areas of the insertion part 110. The first copying prevention number is a number unrelated to a medium number and may be a number generated by the external server 10 to apprehend the skimmer.

The receiver 170*a* according to the present embodiment may receive the information on the first copying prevention number from the external server 10 connected through a wire or wirelessly. The external server 10 may update the first copying prevention number to be a new number according to a preset period or condition, and the receiver 170*a* may receive the new number updated by the external server 10 according to a predetermined setting condition. For example, the setting condition may be the use of the financial device by the user of the medium.

The financial device 101 according to the present embodiment illustrated in FIG. 5 has an effect of making an illegal medium recognition device, which may be installed to recognize the information included in the inserted medium, recognize the first copying prevention number rather than the medium number.

Figure 6:
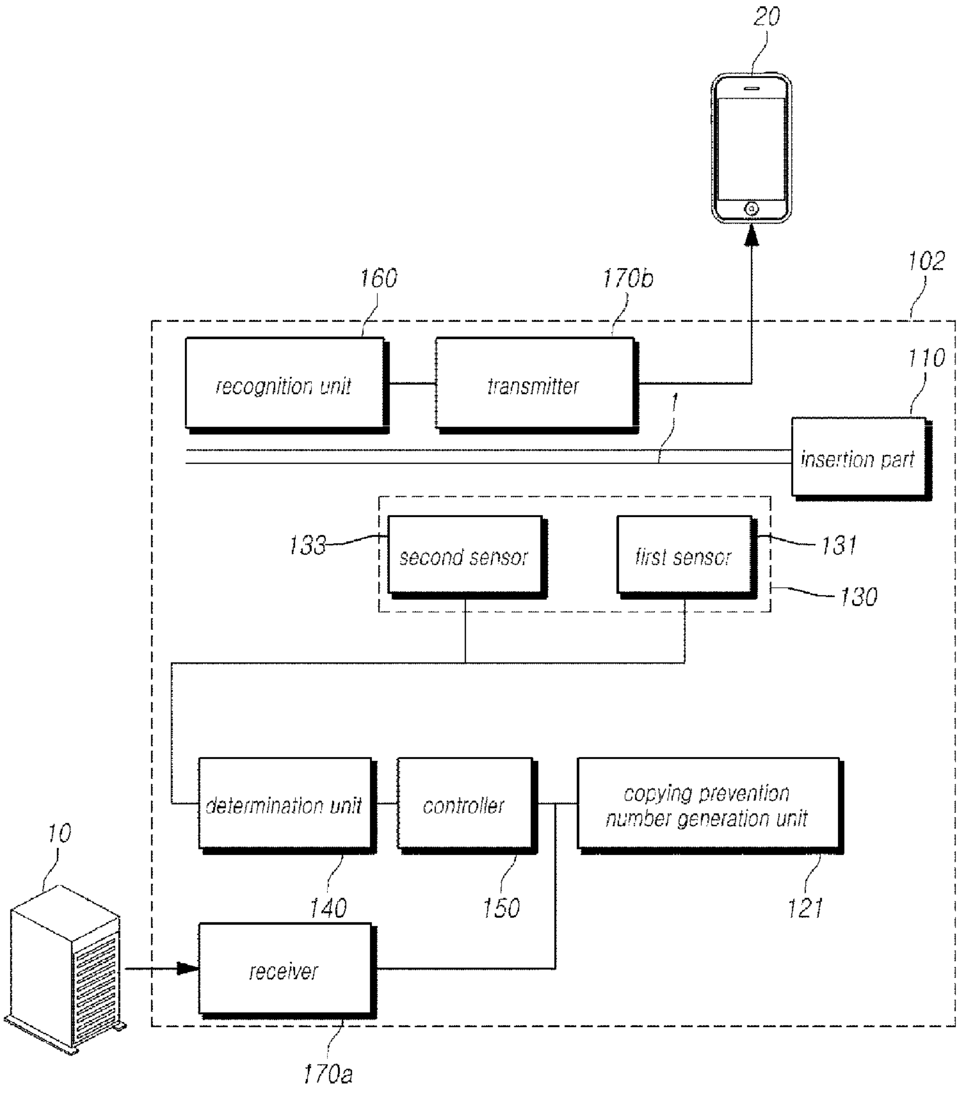
FIG. 6 is a view illustrates a fourth embodiment of the financial device.

FIG. 6 illustrates a fourth example of the financial device according to the present embodiment.

Referring to FIG. 6, a financial device 102 according to the present embodiment may further include the transmitter 170*b* for, when the card reader unit 160 recognizes the information on the first copying prevention number from the inserted medium, transmitting the illegal medium recognition device operation information indicating that the illegal medium recognition device is operating to a terminal 20 of a security manager compared to the financial device 101 according to the present embodiment described through FIG. 5.

Accordingly, when the card reader unit 160 recognizes a copied medium including the information on the first copying prevention number, the transmitter 170*b* according to the present embodiment, which is connected to the terminal 20 of the security manager through a wire or wirelessly, may transmit the illegal medium recognition device operation information to the terminal 20 of the security manager. The security manager may be a staff of a security company or the police.

The financial device 102 according to the present embodiment illustrated in FIG. 6 has an effect in making it possible to apprehend the criminal who attempts financial transactions using the copied medium by immediately informing the security manager that the copied medium including the first copying prevention number recognized by the additionally installed illegal medium recognition device is being used.

Figure 7:
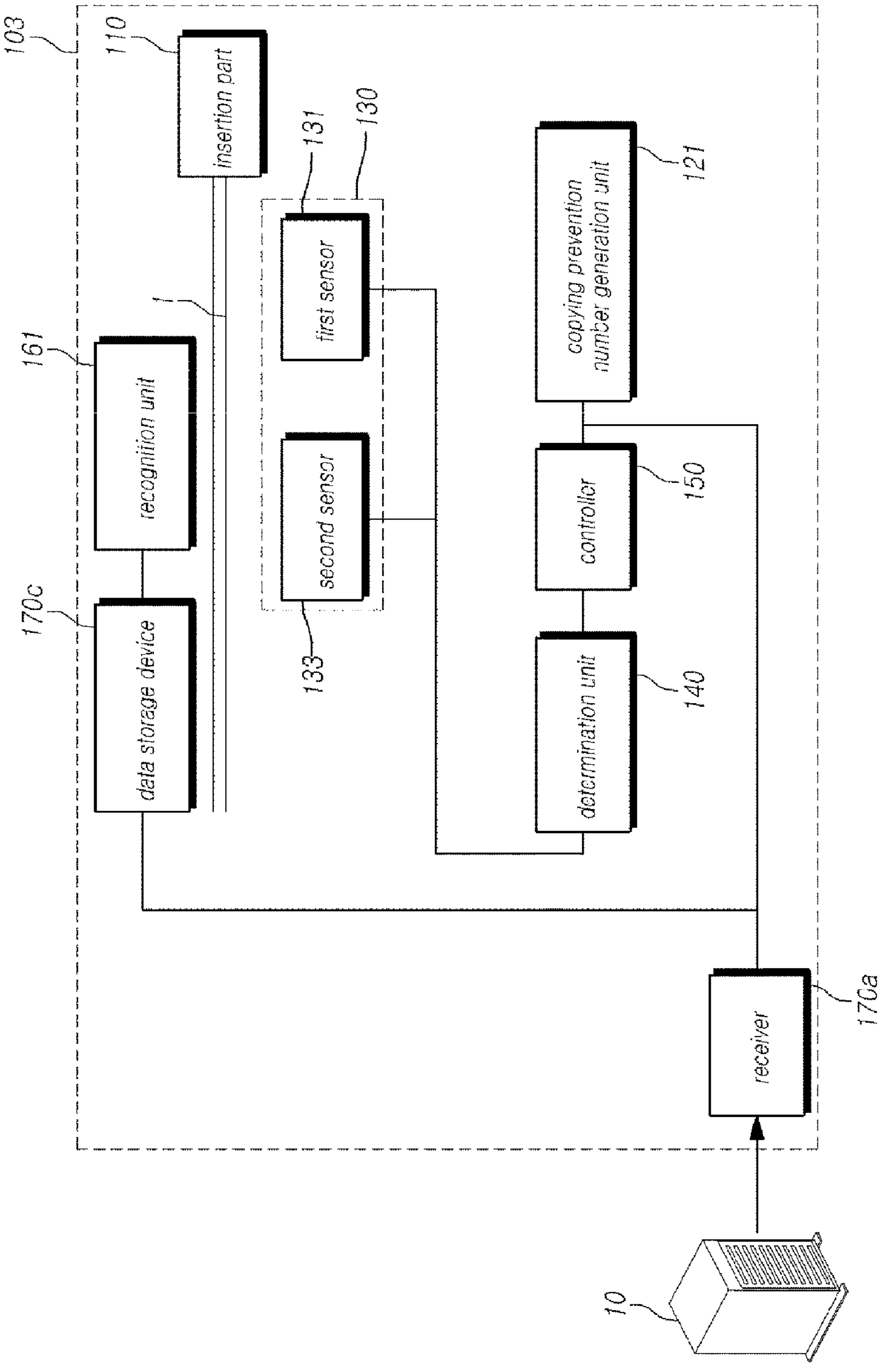
FIG. 7 is a view illustrates a fifth embodiment of the financial device.

FIG. 7 illustrates a fifth example of the financial device according to the present embodiment.

Referring to FIG. 7, a financial device 103 according to the present embodiment may further include a data storage device 170*c* for storing the information on the first copying prevention number received by the receiver 170*a* compared to the financial device 101 according to the present embodiment described through FIG. 5.

Accordingly, the card reader unit 161 included in the financial device 103 may additionally recognize information included in the medium by comparing it with the first copying prevention number stored in the data storage device 170*c*. Therefore, the card reader unit 161 may recognize whether the inserted medium is an illegally copied medium.

Figure 8:
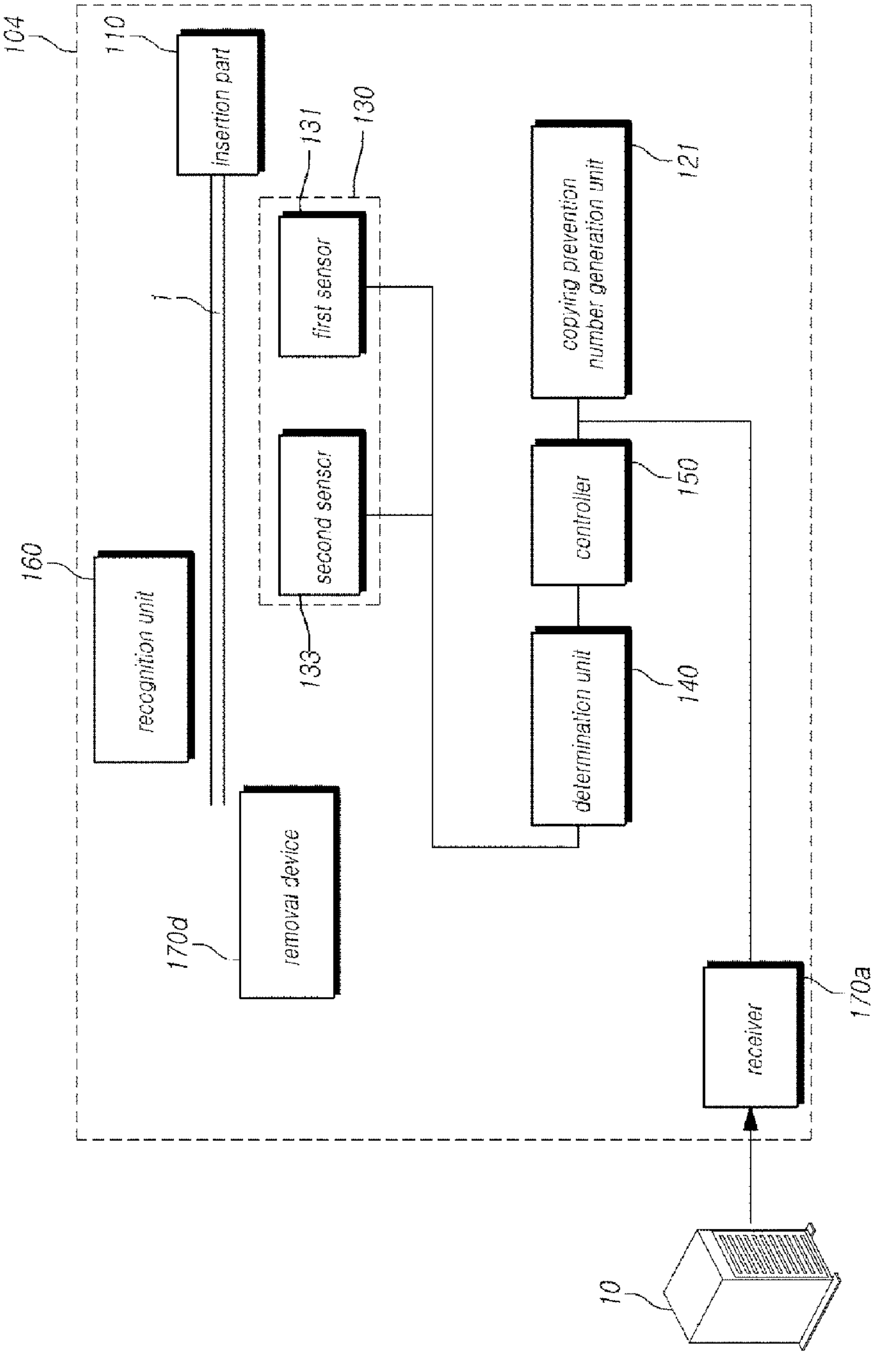
FIG. 8 is a view illustrates a sixth embodiment of the financial device.

FIG. 8 illustrates a sixth example of the financial device.

Referring to FIG. 8, a financial device 104 according to the present embodiment may further include a removal device 170*d* for removing the inserted medium when the card reader unit 160 recognizes the information on the first copying prevention number compared to the financial device 101 according to the embodiment described through FIG. 5.

The removal device 170*d* may include a removal container for storing the medium and a device that may move the inserted medium to the removal container, and may be installed at a third position on the movement path 1 of the inserted medium. The third position may be located after the first position at which the first sensor 131 is installed and the second position at which the second sensor 133 is installed.

The financial device 104 according to an embodiment illustrated in FIG. 8 has an effect of preventing the criminal from not using the copied medium any more by removing the illegally copied medium.

Figure 9:
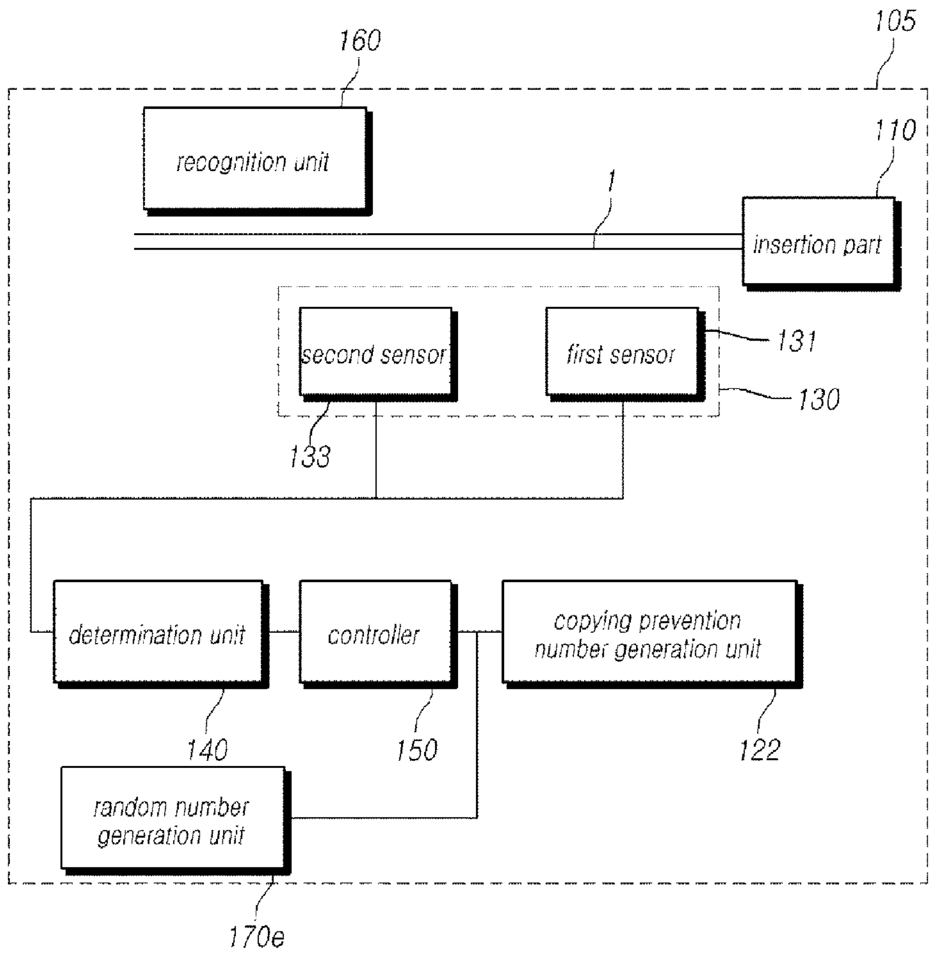
FIG. 9 is a view illustrates a seventh embodiment of the financial device.

FIG. 9 illustrates a seventh example of the financial device.

Referring to FIG. 9, a financial device 105 according to the present embodiment may further include a random number generation unit 170*e* for generating a second copying prevention number corresponding to a random number unrelated to the medium number compared to the financial device 100 according to the embodiment described through FIGS. 1 to 4C.

Accordingly, a random number generation unit 122 included in the financial device 105 may transmit a second signal including the second copying prevention number generated from the random number generation unit 170*e* toward an external area of the insertion part 110. The second copying prevention number may be a random number for performing jamming to make the medium number not exposed.

The financial device 105 according to the present embodiment illustrated in FIG. 9 has an effect of making the general illegal medium recognition device, which may be installed outside the insertion part 110, recognize the second copying prevention number rather than the medium number.

Figure 10:
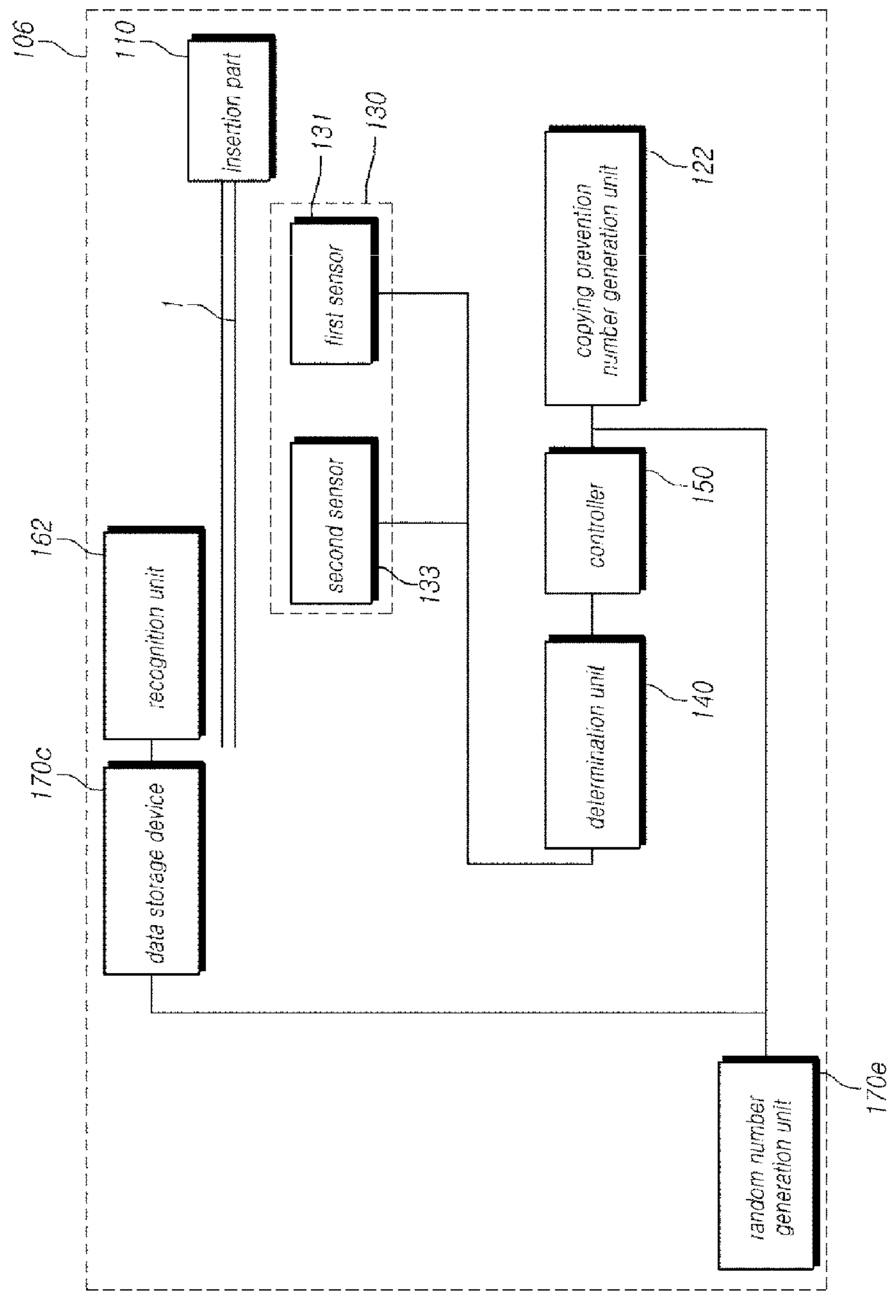
FIG. 10 is a view illustrates an eighth embodiment of the financial device.

FIG. 10 illustrates an eighth example of the financial device.

Referring to FIG. 10, a financial device 106 according to the present embodiment may further include the data storage device 170*c* for storing information on the second copying prevention number generated from the random number generation unit 170*e* compared to the financial device 105 according to the embodiment described through FIG. 9.

Accordingly, the card reader unit 162 included in the financial device 106 may additionally recognize information included in the medium by comparing it with the second copying prevention number stored in the data storage device 170*c*. That is, the card reader unit 162 may recognize whether the inserted medium is an illegally copied medium.

Figure 11:
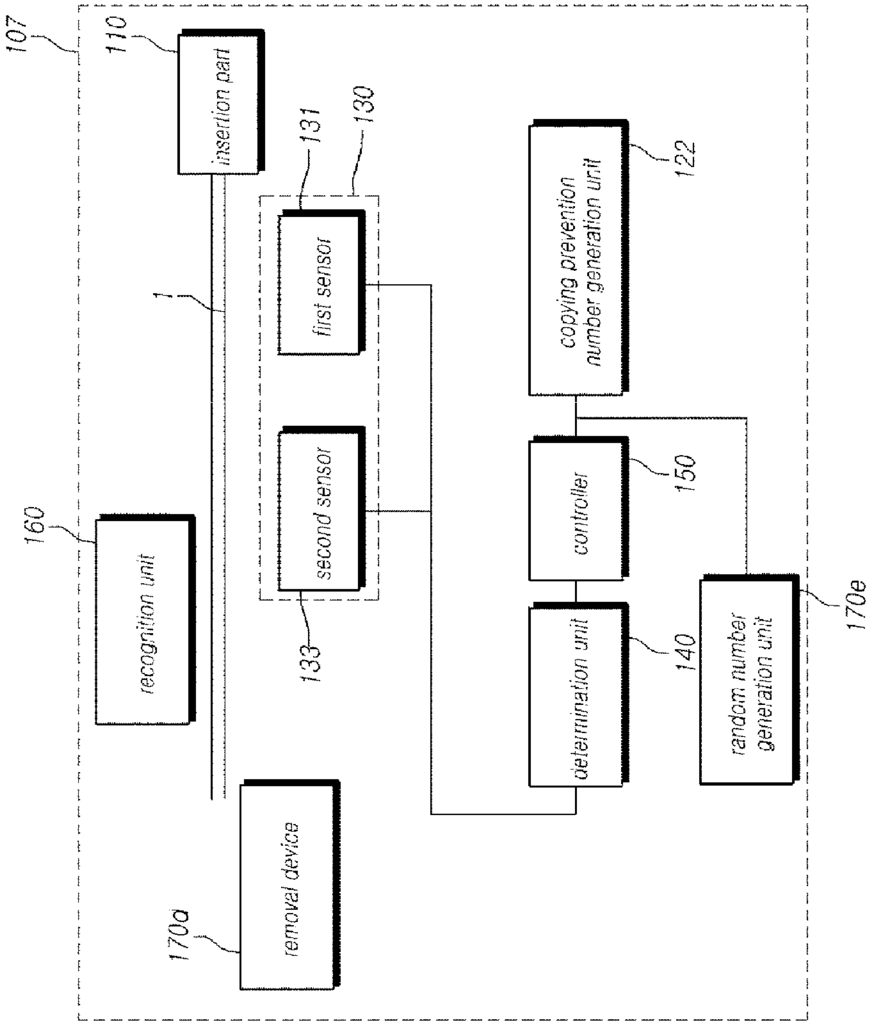
FIG. 11 is a view illustrates a ninth embodiment of the financial device.

FIG. 11 illustrates a ninth example of the financial device.

Referring to FIG. 11, a financial device 107 according to the present embodiment may further include the removal device 170*d* for removing the inserted medium when the card reader unit 160 recognizes the information on the second copying prevention number compared to the financial device 105 according to the embodiment described through FIG. 9.

The removal device 170*d* may include a removal container for storing the medium and a device that may move the inserted medium to the removal container, and may be installed at a third position on the movement path 1 of the inserted medium. The third position may be located after the first position at which the first sensor 131 is installed and the second position at which the second sensor 133 is installed.

Hereinafter, a financial device control method corresponding to the operation performed by the financial device described through FIGS. 1 to 11 will be briefly described.

Figure 12:
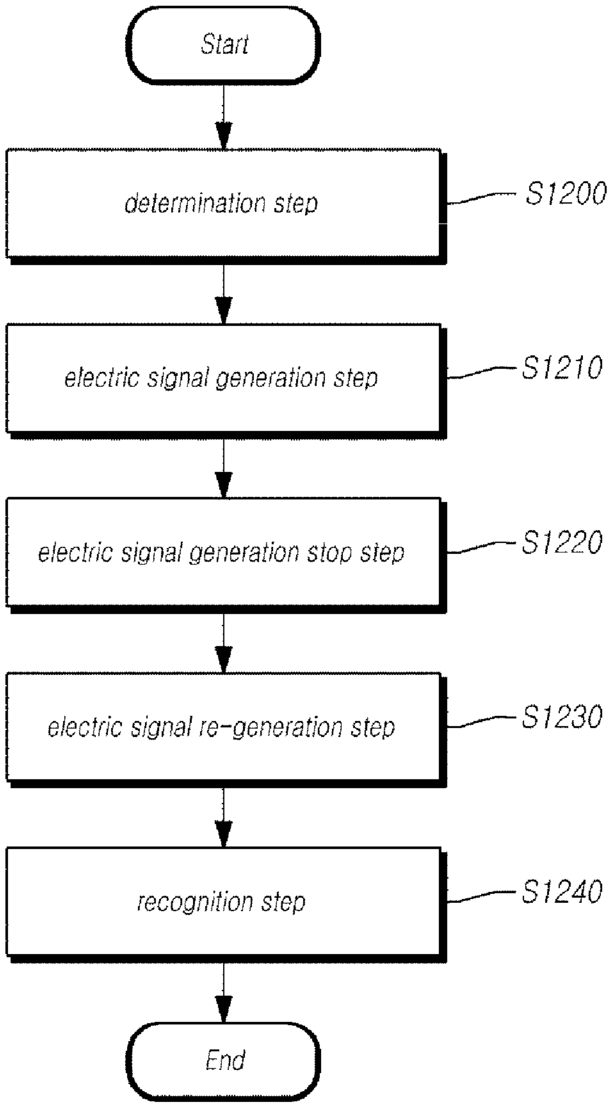
FIG. 12 is a flowchart illustrating a financial device control method according to an embodiment of the present embodiment.

FIG. 12 is a flowchart illustrating a financial device control method according to the present embodiment.

Referring to FIG. 10, a financial device control method according to the present embodiment may include a determination step S1200 of detecting the existence of a medium and determining whether the medium is completely inserted or is being removed based on a generated detection signal; an signal generation step S1210 of generating an signal including information on a copying prevention number for preventing copying of a medium by a random number generation unit; an signal generation stop step S1220 of stopping the generation of the signal by the random number generation unit when it is determined that the medium is completely inserted; an signal re-generation step S1230 of generating the signal again by the random number generation unit when it is determined that the medium is being removed; and a recognition step S1240 of recognizing information included in the medium by a recognition device installed at one position on a movement path of the inserted medium.

When the detection is generated and then stopped, the determination step S1200 of the financial device control method according to the present embodiment may determine that the medium is completely inserted through the insertion part.

Further, when the detection signal is generated again after it is determined that the medium is completely inserted, it may be determined that the medium is being removed.

A detailed description thereof will refer to FIG. 2 and FIGS. 4A to 4C.

The signal generation step S1210 of the financial device control method according to an embodiment may generate an signal including information on the copying prevention number for preventing copying of a medium by using the random number generation unit that operates according to an on signal toward an external area of the insertion part.

For example, the random number generation unit may apply Magnetic Secure Transmission (MST) for wireless transmission of the signal. The MST refers to a type in which when the user touches a smart phone inserted into a device including credit card information to a credit card payment terminal, the terminal reads the credit card information and performs the payment. That is, the MST is a method of performing the payment by wirelessly transmitting information on a magnetic credit card and may be different from Near Field Communication (NFC).

The signal output from the random number generation unit may jam information recognized by an illegal medium recognition device, which may be installed in an external area of the insertion part, and prevent the medium from being recognized.

Further, the signal output from the random number generation unit may have a copying prevention number and may make the illegal medium recognition device exposed to the signal recognize the copying prevention number instead of the medium number by jamming the information recognized by the illegal medium recognition device. The illegal medium recognition device may include a swipe type or an insertion type Magnetic Script Reader/Writer (MSRW).

For example, the random number generation unit may have a similar operation to that of a loop-pay module.

When it is determined that the medium is completely inserted in the determination step S1200, the signal generation stop step S1220 of the financial device control method according to an embodiment may stop the signal generated by inputting an off signal into the random number generation unit that generates the signal by the signal generation step S1210.

When it is determined that the medium is being removed in the determination step S1200, the signal re-generation step S1230 of the financial device control method according to an embodiment may generate the stopped signal again by inputting the on signal into the random number generation unit that stops the generation of the signal by the signal generation stop step S1220.

The recognition step S1240 of the financial device control method according to an embodiment may recognize information included in the inserted medium through a recognition device installed at one position on a movement path of the inserted medium. The recognition device may be a swipe type or an insertion type Magnetic Script Reader/Writer (MSRW).

Further, the financial device control method according to an embodiment may further include a reception step of receiving information on the first copying prevention number for apprehending the skimmer through a network connection with an external server corresponding to a server of a company related to the medium or the bank. Accordingly, in the signal generation step S1210 or the signal re-generation step S1230, the random number generation unit may generate a first signal including the information on the first copying prevention number toward an external area of the insertion part. Further, when the information on the first copying prevention number is recognized from the inserted medium in the recognition step S1240, the method may further include a transmission step of transmitting information indicating that the skimmer is in a state of transaction suspension to a terminal of a security manager.

Further, the financial device control method according to an embodiment may further include a random number generation step of generating a second copying prevention number unrelated to the medium number. Accordingly, in the signal generation step S1210 or the signal re-generation step S1230, the random number generation unit may generate a second signal including the information on the second copying prevention number toward an external area of the insertion part.

The financial device control method according to an embodiment described through FIG. 10 has an effect of preventing an illegal medium recognition device, which may be illegally installed outside the insertion part by the criminal, from recognizing the information included in the medium.

Further, the financial device control method according to an embodiment may make the illegal medium recognition device, which may be illegally installed outside the insertion part, recognize the first copying prevention number for apprehending the skimmer rather than the information included in the medium. Accordingly, the financial device control method according to an embodiment may make it possible to apprehend the criminal who attempts financial transactions through the copied medium including the first copying prevention number. To this end, the recognition step S1240 may additionally recognize the information included in the medium by comparing it with the information on the first copying prevention number.

In addition, the financial device control method according to the present embodiment may include all operations which the financial device according to the present embodiment described based on FIGS. 1 to 11 performs.

The above description and the accompanying drawings provide an example of the technical idea of the present embodiment for illustrative purposes only. Those having ordinary knowledge in the technical field, to which the present embodiment pertains, will appreciate that various modifications and changes in form, such as combination, separation, substitution, and change of a configuration, are possible without departing from the essential features of the present embodiment. Therefore, the embodiments disclosed in the present disclosure are intended to illustrate the scope of the technical idea of the present invention, and the scope of the present invention is not limited by the embodiment. The scope of the present embodiment shall be construed on the basis of the accompanying claims in such a manner that all of the technical ideas included within the scope equivalent to the claims belong to the present invention.

What is claimed is:

1. A financial device comprising:

an insertion part to which a medium is inserted;

a random number generation unit configured to generate a signal including information on a copying prevention number for preventing skimming of the medium;

a detection unit installed near the insertion part and configured to generate a detection signal by detecting the existence of the medium; and a controller configured to control the generation of the copying prevention number by identifying a state of the medium according to the detection signal, wherein the financial device further comprising:

a determination unit configured to determine whether the medium has been completely inserted or is being removed based on the detection signal; and a card reader unit installed at one position of a movement path of the inserted medium and configured to recognize information included in the medium, wherein the controller generates an on signal for the operation of the random number generation unit and, when it is determined that the medium has been completely inserted as the state of the medium, generates an off signal to make the random number generation unit not operate and, when it is determined that the medium is being removed as the state of the medium, generates the on signal to make the random number generation unit operate again, wherein the financial device further comprising a receiver connected to an external server corresponding to a server of a company related to the medium or a bank through a network and configured to receive information on a first copying prevention number, wherein the random number generation unit generates a first signal including the information on the first copying prevention number and transmits the first signal to the external area.

2. The financial device of claim 1, further comprising a transmitter configured to transmit skimmer operation information indicating that the skimmer is operating to a terminal of a security manager when the information on the first copying prevention number is recognized from the medium.

3. The financial device of claim 1, further comprising a data storage device configured to store the information on the first copying prevention number, wherein the card reader unit additionally recognizes the information included in the medium by comparing it with the information on the first copying prevention number stored in the data storage device.

4. The financial device of claim 1, further comprising a removal device configured to remove the medium when the information on the first copying prevention number is recognized from the medium.

5. A financial device comprising:

an insertion part to which a medium is inserted;

a random number generation unit configured to generate a signal including information on a copying prevention number for preventing skimming of the medium;

a detection unit installed near the insertion part and configured to generate a detection signal by detecting the existence of the medium; and a controller configured to control the generation of the copying prevention number by identifying a state of the medium according to the detection signal, wherein the financial device further comprising:

a determination unit configured to determine whether the medium has been completely inserted or is being removed based on the detection signal; and a card reader unit installed at one position of a movement path of the inserted medium and configured to recognize information included in the medium, wherein the controller generates an on signal for the operation of the random number generation unit and, when it is determined that the medium has been completely inserted as the state of the medium, generates an off signal to make the random number generation unit not operate and, when it is determined that the medium is being removed as the state of the medium, generates the on signal to make the random number generation unit operate again, wherein the financial device further comprising a random number generation unit configured to generate a second copying prevention number corresponding to a random number unrelated to the medium number, wherein the random number generation unit generates a second signal including information on the second copying prevention number and transmits the second signal to the external area, wherein the financial device further comprising a data storage device configured to store the information on the second copying prevention number, wherein the card reader unit additionally recognizes the information included in the medium by comparing it with the information on the second copying prevention number stored in the data storage device.

6. The financial device of claim 5, further comprising a removal device configured to remove the medium when information on the second copying prevention number is recognized from the medium.

7. The financial device of claim 5, wherein the determination unit determines that the medium has been completely inserted when the detection signal is generated and then stopped, and determines that the medium is being removed when the detection signal is generated again.

8. The financial device of claim 5, wherein the detection unit comprises a first sensor installed at a first position near the insertion part on the path and configured to detect the existence of the medium and a second sensor installed at a second position spaced apart from the first position by a predetermined distance and configured to detect the existence of the medium, and the determination unit determines that the medium is completely inserted when a detection signal of the second sensor is generated after a detection signal of the first sensor is generated.

9. A financial device comprising:

an insertion part to which a medium is inserted;

a random number generation unit configured to generate a signal including information on a copying prevention number for preventing skimming of the medium;

a detection unit installed near the insertion part and configured to generate a detection signal by detecting the existence of the medium; and a controller configured to control the generation of the copying prevention number by identifying a state of the medium according to the detection signal, wherein the financial device further comprising:

a determination unit configured to determine whether the medium has been completely inserted or is being removed based on the detection signal; and a card reader unit installed at one position of a movement path of the inserted medium and configured to recognize information included in the medium, wherein the controller generates an on signal for the operation of the random number generation unit and, when it is determined that the medium has been completely inserted as the state of the medium, generates an off signal to make the random number generation unit not operate and, when it is determined that the medium is being removed as the state of the medium, generates the on signal to make the random number generation unit operate again, wherein the detection unit comprises a first sensor installed at a first position near the insertion part on the path and configured to detect the existence of the medium and a second sensor installed at a second position spaced apart from the first position by a predetermined distance and configured to detect the existence of the medium, and the determination unit determines that the medium is being removed when a detection signal of the first sensor is generated after a detection signal of the second sensor is generated, wherein, when the detection signal of the first sensor is stopped after it is determined that the medium is being removed, the controller generates the off signal to make the random number generation unit not operate again.

10. The financial device of claim 9, wherein the card reader unit recognizes the information included in the medium when a detection signal of a first sensor is stopped after it is determined that the medium is completely inserted.

* * * * *